United States Patent [19]
Laycock

[11] Patent Number: 6,145,419
[45] Date of Patent: Nov. 14, 2000

[54] DRIVE TRANSMITTING DEVICE

[75] Inventor: Michael Laycock, Cross Hills-Keighley, United Kingdom

[73] Assignee: Unova UK Ltd., United Kingdom

[21] Appl. No.: 08/737,974

[22] PCT Filed: Apr. 20, 1995

[86] PCT No.: PCT/GB95/00888

§ 371 Date: Feb. 6, 1997

§ 102(e) Date: Feb. 6, 1997

[87] PCT Pub. No.: WO95/32836

PCT Pub. Date: Dec. 7, 1995

[30] Foreign Application Priority Data

May 27, 1994 [GB] United Kingdom .................... 9410682
Nov. 30, 1994 [GB] United Kingdom .................... 9424139

[51] Int. Cl.[7] ....................................................... B23B 1/00
[52] U.S. Cl. ............................... 82/1.11; 82/165; 82/168; 82/162; 82/151; 464/95
[58] Field of Search ................................. 82/1.11, 96, 97, 82/99.1, 101, 142, 148, 151, 162, 163, 165, 166, 169, 168, 905; 464/93, 94, 95, 96

[56] References Cited

U.S. PATENT DOCUMENTS

| | | | |
|---|---|---|---|
| 2,593,877 | 4/1952 | Hagenlocher | 464/95 |
| 2,846,856 | 8/1958 | Hagenlocher | 464/95 |
| 2,846,857 | 8/1958 | Hagenlocher | 464/95 |
| 4,203,303 | 5/1980 | Miller | 464/55 |

FOREIGN PATENT DOCUMENTS

| | | | |
|---|---|---|---|
| 630805 | 6/1936 | Germany . | |
| 0564461 | 7/1977 | U.S.S.R. | 464/95 |
| 001650382 | 5/1991 | U.S.S.R. | 85/165 |
| 001751521 | 7/1992 | U.S.S.R. | 464/94 |

*Primary Examiner*—Henry W. H. Tsai
*Attorney, Agent, or Firm*—Morris I. Pollack

[57] ABSTRACT

A method of drive decoupling, and a drive decoupling device, utilized in connecting a driving member to a driven members that is attachable to a workpiece to be rotated about a drive axis, includes a laminated plurality of flexible sheet material, attached to the driving member by at least one off axis connection and to the driven member by at least one other off axis connection circumferentially spaced from the one off axis connection, and which is torsionally rigid in a plane perpendicular to the drive axis so as to accommodate any eccentricity developed through misalignment of the driving member and driven member. The coupling device is centrally apertured so that a headstock can extend therethrough. A pair of drive decoupling devices are also provided in series by connecting the driven member of one to the driving member of another. A clamp ring securing device is also provided with two fixed positioning and holding members and one spring loaded and externally adjustable positioning and holding member; the three holding members being circumferentially spaced about the ring.

27 Claims, 6 Drawing Sheets

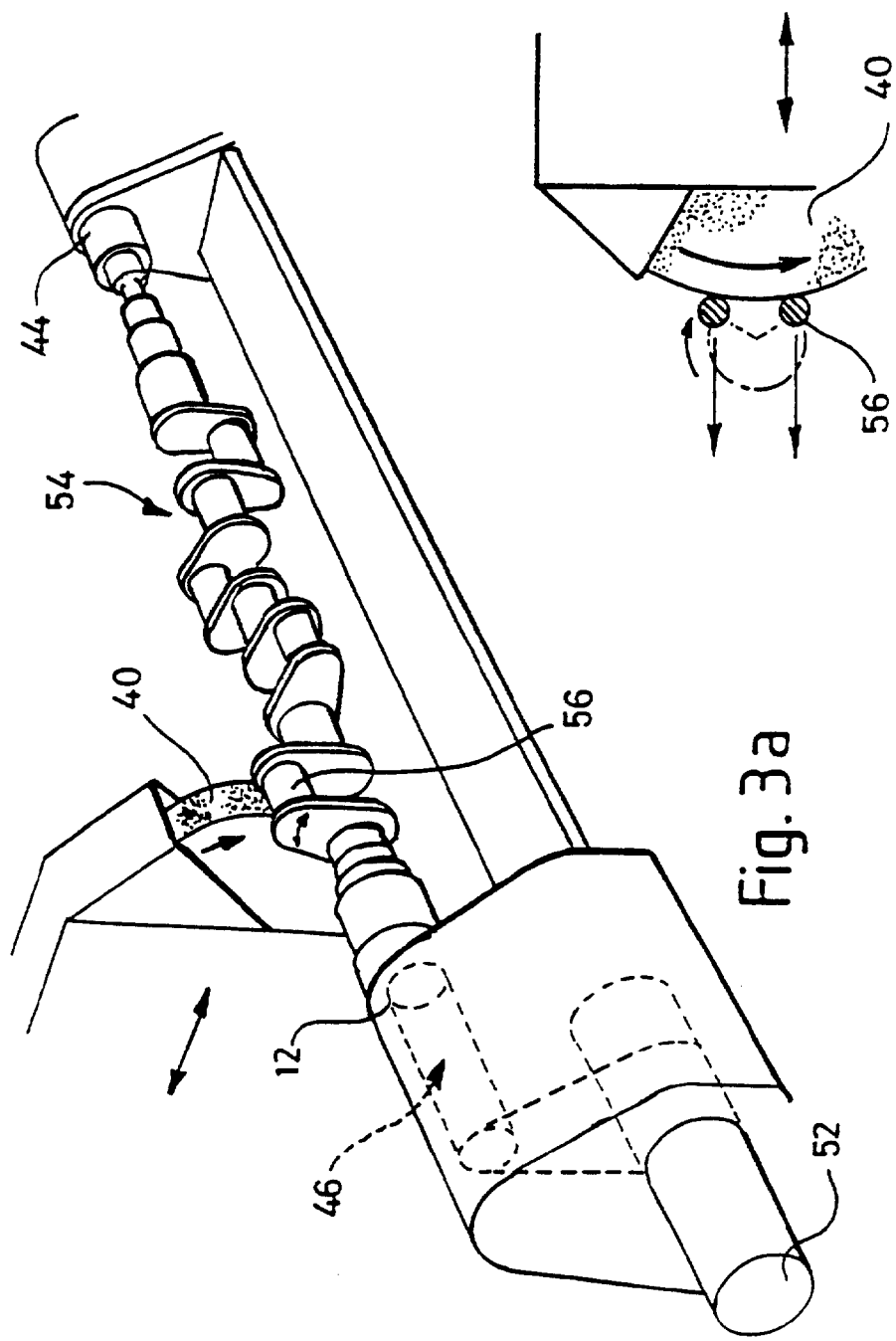

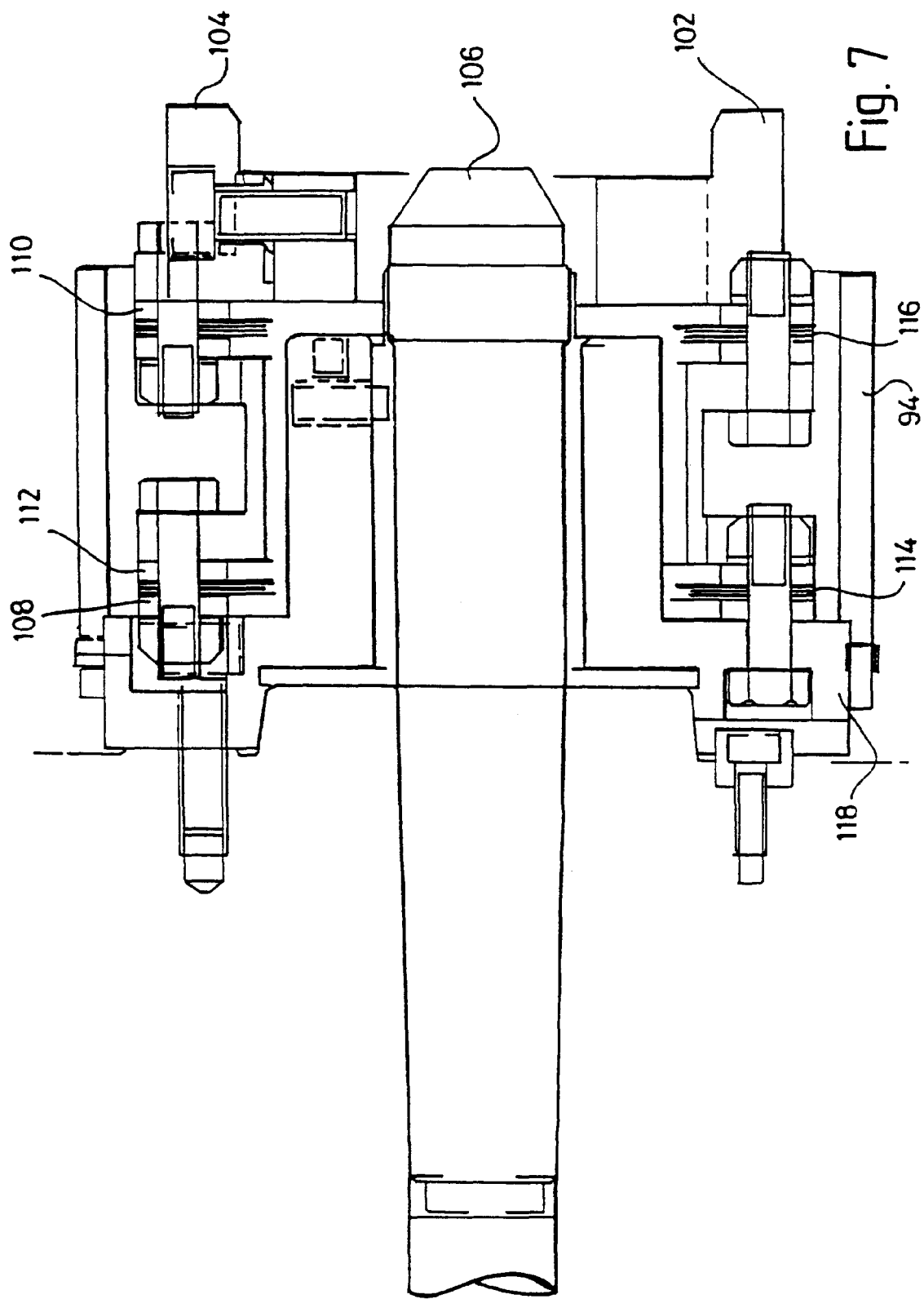

DRIVE TRANSMITTING DEVICE

FIELD OF THE INVENTION

This invention relates to a drive transmitting device for use in transmitting torque to an article to be rotated. The invention is of particular use in transmitting rotational drive to a workpiece in a lathe or grinding machine or the like.

BACKGROUND OF THE INVENTION

When machining articles to a desired shape it is often necessary to rotate the article (usually termed the workpiece) so that symmetrical machining can be achieved of a given cross section. This applies to both lathe type devices where cutting tools are used and to grinding machines where a rotating grinding wheel runs against a rotating load or workpiece.

Rotation of the workpiece to be machined can be achieved by securing the workpiece into a rotating chuck. However if the workpiece is not centralised correctly within the clamping jaws of the chuck, it will not rotate in a 'true' fashion and machining will be inaccurate.

Alternative methods of transmitting rotation involve the use of a tailstock and a headstock to support the article, the headstock transmitting the rotation, directly or indirectly to the workpiece.

The interengagement between the workpiece and the headstock or driver may be subject to misalignment and offset, which will introduce errors in the machining.

It is one object of the present invention to provide an improved drive transmitting device which will not transmit misalignment or offset to the workpiece.

SUMMARY OF THE INVENTION

According to one aspect of the present invention a method of decoupling a driven member from a driving member used to rotate the driven member comprises the step of connecting the driving member to the driven member via a connecting means which is torsionally rigid in a plane generally perpendicular to the axis of rotation of the driven member, but is readily deformable in other planes to accommodate misalignment.

According to another aspect of the invention a drive decoupling means as aforesaid comprises a driving member and a driven member which is attachable to a load so as to rotate the latter and a connecting means for transferring torque therebetween which comprises a laminated device attached to the driving member via at least one off axis connection and to the driven member by at least one other off axis connection, the connections being circularly spaced one from the other.

By forming the laminations from flexible thin sheet steel, the connecting means is torsionally rigid in a plane perpendicular to the drive axis so as to ensure rotation is transmitted reliably to the driven member, but the flexibility of the laminations accommodates any eccentricity developed through misalignment of the driving member and driven member.

In this way the driven member and therefore the workpiece is decoupled from the driving member.

Where the load is a workpiece and is to be mounted between a headstock and tailstock, the components of the drive decoupling means may be centrally apertured to accommodate the headstock, which can thereby extend axially therethrough.

The driven member may be provided with radially adjustable means for securing it to the load.

Preferably the securing means is arranged symmetrically and allows centering of the member relative to the load.

Alternatively the securing means may comprise radially fixed and radially adjustable positioning and holding members.

In a further arrangement the securing means may comprise one or more radial members which are securable so as to grip the load, where the load is a workpiece, but are spring loaded in a direction away from the workpiece so as to cause separation from the workpiece to facilitate its demounting after a machining operation.

The radial member(s) may be externally adjustable.

In a preferred embodiment at least two radial members are provided, in which at least one radial member is adjustable and at least one other radial member is fixed.

The adjustment may be provided by pneumatic, electrical or hydraulic means so that release and removal of a workpiece can be performed automatically.

In another arrangement three positioning and holding members may be arranged circularly around an annular member, two being fixed thereto and the third being spring loaded in a direction to engage the load when the load comprises a workpiece, such that the latter is positioned between the three members, and displacement of the annular member in a direction parallel to the axis of the sprung member so as to compress the spring results in separation of the sprung and fixed members from the workpiece to facilitate its removal.

In a particularly preferred embodiment, two drive decoupling means as aforesaid are connected in series, the driven member of the first being connected to the driving member of the second. Such an arrangement allows even greater decoupling to be achieved than if only a single drive decoupling means is employed and permits offset as well as misalignment to be accommodated.

The invention also lies in a lathe having a headstock and tailstock for supporting a workpiece therebetween, wherein rotation of the workpiece is effected through one or more drive decoupling means as aforesaid particularly an arrangement involving two such drive decoupling means connected in series so as to remove errors due to offset as well as misalignment.

The invention also lies in a grinding machine having a headstock and tailstock for supporting a workpiece to rotate with a grinding wheel, wherein rotation of the workpiece is effected through one or more drive decoupling means as aforesaid, particularly an arrangement involving one having two such drive decoupling means connected in series, so as to remove errors due to offset as well as misalignment.

As applied to a grinding machine, the invention is of value in that it permits an NCR grinding machine to be used to grind off-axis elements of a workpiece by synchronously advancing and retracting the grinding wheel as the workpiece is rotated. This permits for example the crankpins of a crankshaft to be ground.

The invention will now be described by way of example with reference to the accompanying drawings in which:

FIG. 3(a) is a perspective view of a drive decoupling means as applied to grinding crankpins FIG. 3(b) is a section through the grinding wheel and crankpin as shown in FIG. 3(a)

Figure 6:
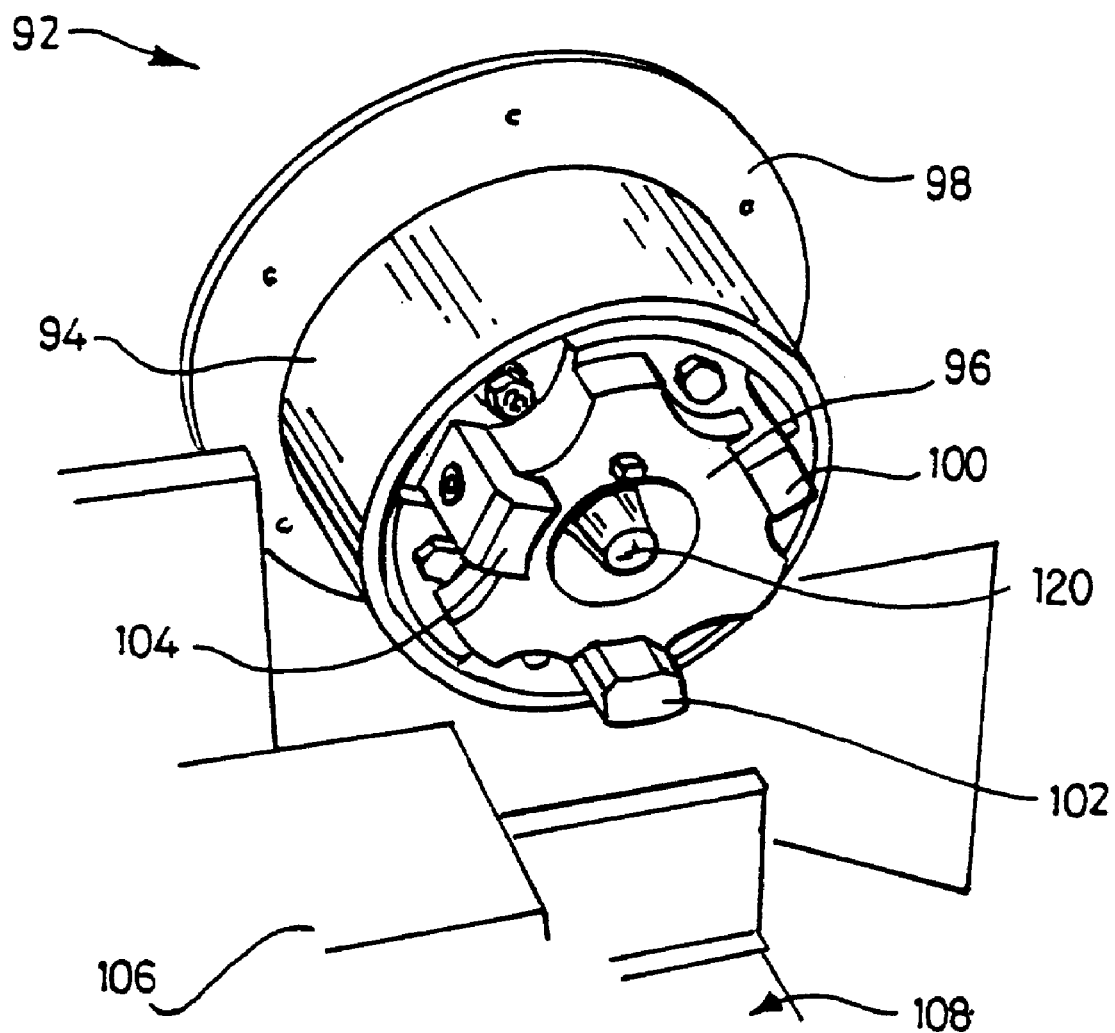

FIG. 6 in a view of a grinding machine with a housing attached encasing a drive decoupling device, and FIG. 7 is a vertical section through the grinding machine housing and housing as shown in FIG. 6.

DETAILED DESCRIPTION OF A PREFERRED EMBODIMENT

Figure 1:
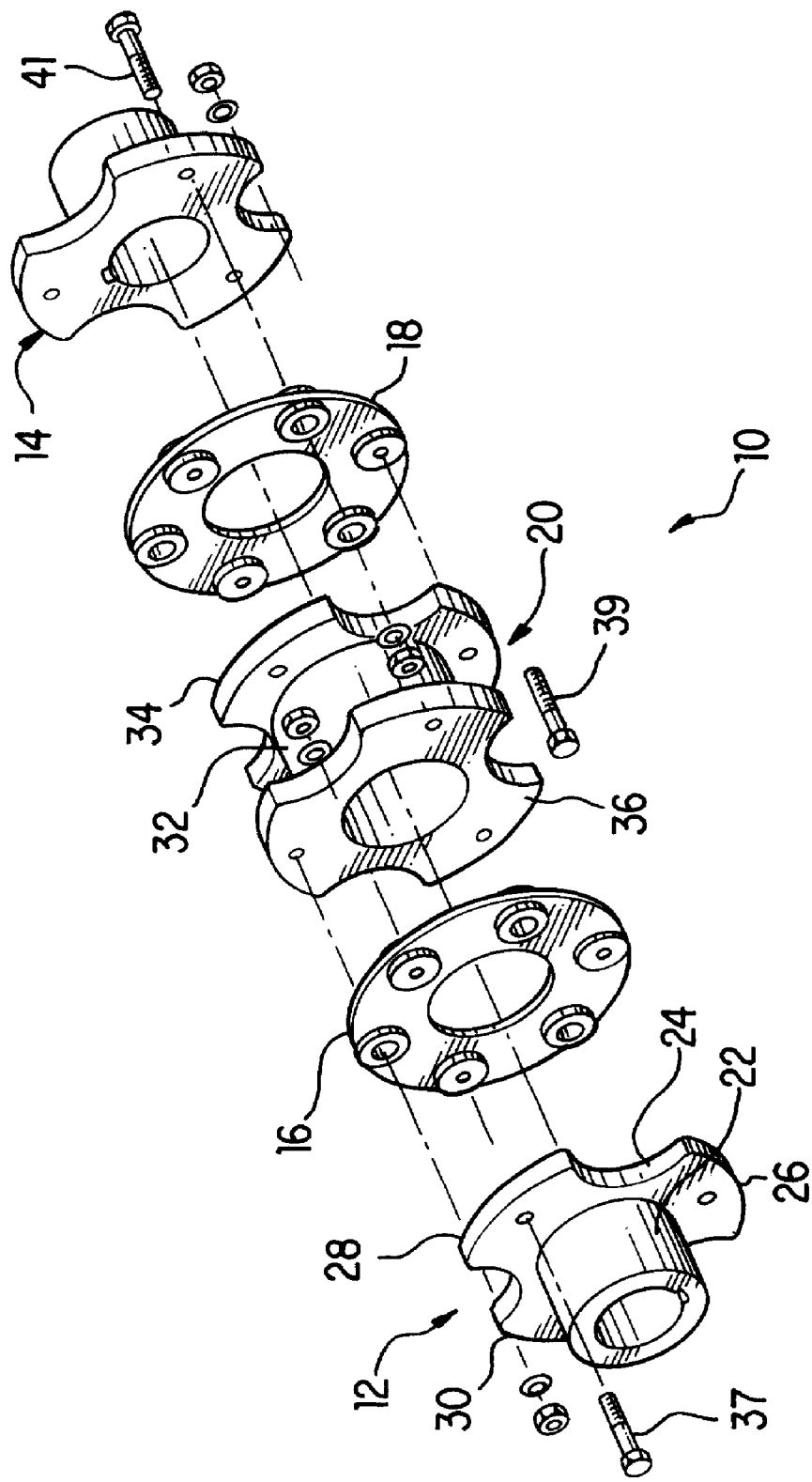
FIG. 1 is an exploded view of a prior art flexible coupling

Referring to FIG. 1, a flexible coupling device 10 is shown. The coupling device 10 is shown exploded to illustrate the separate components.

The coupling device 10 comprises two identical connecting members 12, 14, two laminated discs 16, 18 each formed from a stack of thin sheet steel rings typically formed from shim steel, and a coupling sleeve 20, all the aforesaid being centrally apertured so as to allow a headstock to extend therethrough.

The connecting member 12 further comprises a cylindrical hub 22, and a circular flange 24 which is cutaway at three circumferentially equally spaced positions. The three resulting lobes 26, 28, 30 are apertured.

The second connecting member 14 is similar in construction.

The coupling sleeve 20 comprises a central cylindrical portion 32 with annular flanges 34, 36 at either end. The flanges 34, 36 are circumferentially cut away to leave lobes in a similar manner as in the flange 24.

In use, the coupling device 10 is assembled so that the connecting members 12, 14 and coupling sleeve 20 are interconnected by the laminated discs of thin shim steel rings 16, 18.

The lobes of the flange 36 of the coupling sleeve 20 are connected to the disc 16 by three hexagon bolts. One of which is shown at 37. Three spaced apertures of the disc 16 are connected to the flange 36.

Similar bolts join the three lobes 26, 28 and 30 of member 12 to the disc 16 at points intermediate the bolts 37.

The second connecting disc 18 is similarly connected to the lobes of the flange 34 by means of three bolts one of which is shown at 39 and similarly to the lobes of the flange 14 by similar bolts one of which is shown at 41.

The members 12, 14 are thus connected to the coupling sleeve 20 through the laminations of the discs 16, 18.

Thus on assembly the interconnection of the individual connecting members 12, 14 and coupling sleeve 20 by use of the flexible laminated thin sheet steel discs 16, 18 ensures a torsionally rigid coupling which may be used in a machine tool to transmit drive to a workpiece. The flexibility of the discs 16, 18 absorbs any misalignment or axial offset of the drive member and workpiece relative to each other.

Figure 2A:
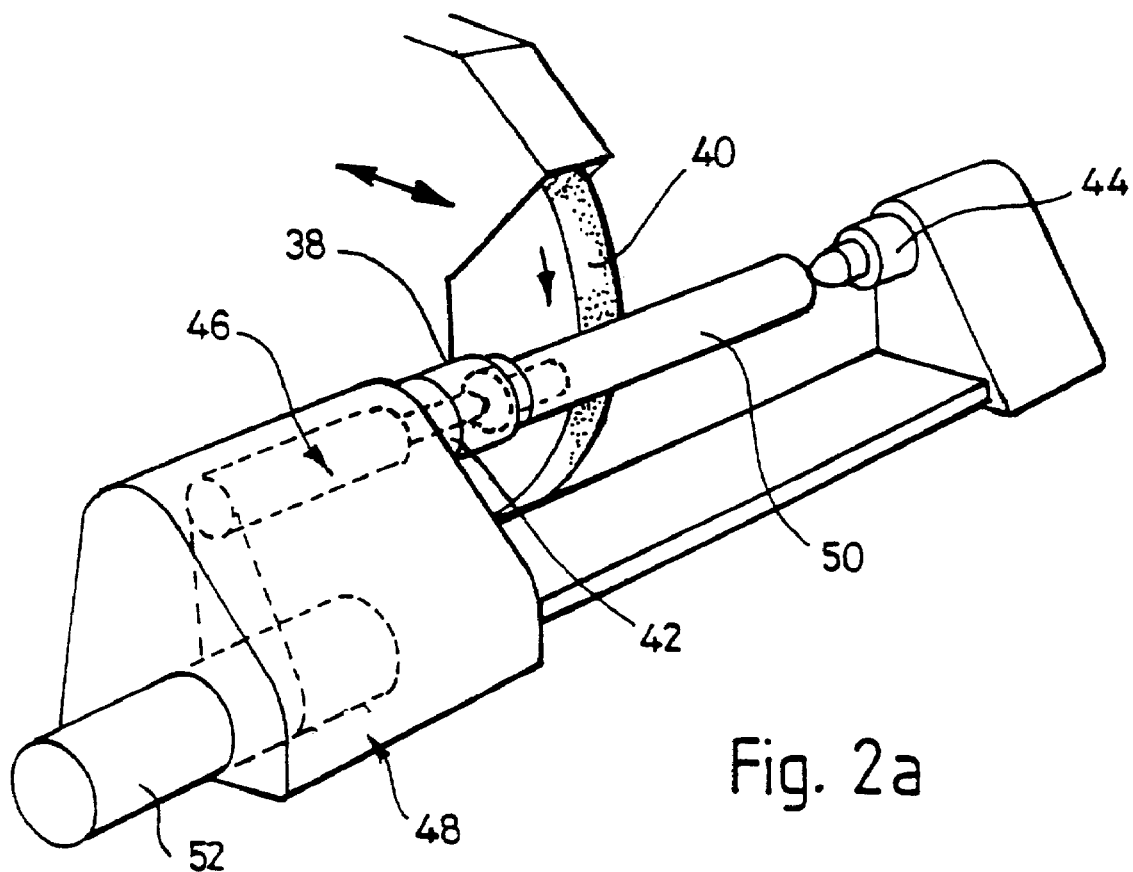
FIG. 2(a) is a perspective view of a drive decoupling means as applied to a grinding machine

A grinding machine embodying the invention is shown in FIG. 2(a) Here a coupling device such as shown in FIG. 1 is encased within a housing 38.

The grinding machine comprises a grinding wheel 40, a headstock 42, a tailstock 44 and drive means 46 contained within a housing 48.

The headstock 42 is free to pass through the centre of the coupling device 10 contained within the housing 38. The headstock 42 and tailstock 44 support a workpiece 50.

The coupling device 10 is connected at one end to the driving means 46 and at the other end is detachably secured to the workpiece 50.

Rotation of the drive means 46 by the motor 52 rotates the coupling device 10. The workpiece 50 is supported between the headstock 42 and tailstock 44 and is rotated by rotation of the coupling device 10 by the motor 52.

The decoupling of the workpiece 50 from the drive means 46 by the coupling device 10 removes errors due to misalignment and offset of the drive means 46 relative to the workpiece 50.

Figure 2B:
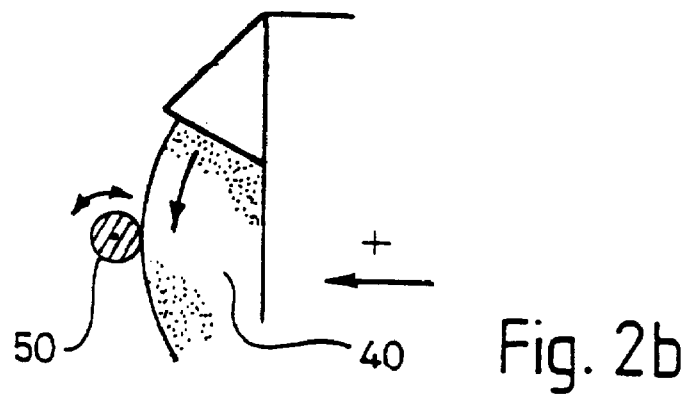
FIG. 2(b) is a sectional view through the grinding wheel and workpiece as shown in FIG. 2(a)

FIG. 2(b) shows the grinding wheel 40 and workpiece 50 during a grinding operation. The grinding wheel 40 contacts the workpiece 50 and grinds the surface to a desired diameter.

FIG. 3(a) shows how a grinding machine can be used for grinding off-axis elements such as the crankpins of a crankshaft 54.

Thus the crankshaft is supported between the headstock 42 and tailstock 44, and includes a number of crankpins one of which is denoted by reference numeral 56.

The drive means 46 rotates the crankshaft 54 via the coupling device 10 as discussed in relation to FIG. 2(a).

Rotation of the crankshaft 54 results in each off axis crankpin describing a circle centred on the crankshaft axis as shown in FIG. 3(b).

The grinding wheel 40 synchronously advances and retracts as the crankshaft 54 rotates and the crankpin 56 describes a circle, this advance and retraction is controlled so that the grinding wheel 40 maintains contact with the crankpin surface at all times during the rotation of the crankshaft 54, thereby grinding a true cylindrical surface on the crankpin 56.

As each crankpin is ground to the desired diameter, the grinding wheel 40 is retracted and moved axially along the crankshaft 54 to register with another crankpin. In this way an entire crankshaft can be ground automatically.

Attachment of the coupling device 10 to the workpiece 50 or crankshaft 54 is preferably achieved by a clamping ring as shown in FIGS. 4(a) and 4(b) and 5(a) and 5(b).

Figure 4A:
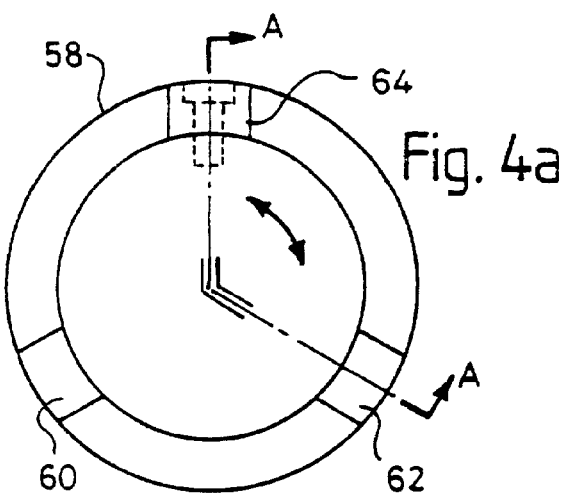
FIG. 4(a) is an end view of a clamping ring for clamping a workpiece to the drive decoupling means

In FIG. 4(a) a clamping ring 58 is shown having two fixed jaws 60, 62 and an adjustable jaw 64.

Figure 4B:
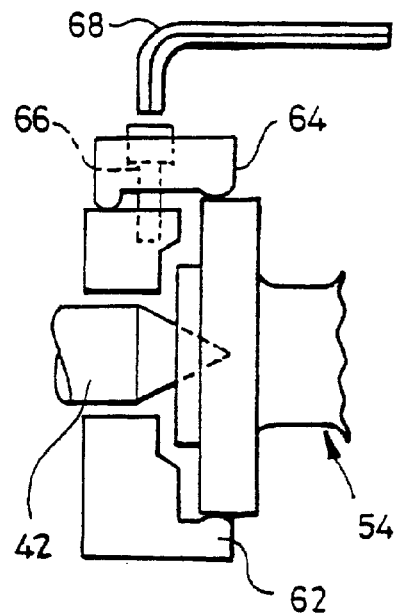
FIG. 4(b) is a section (not to scale) along line A—A of FIG. 4(a).

FIG. 4(b) is a section (not to scale) along line A—A of FIG. 4(a).

In use the crankshaft 54, is inserted between the three jaws 60, 62, 64 and the adjustable jaw 64 is tightened onto the crankshaft 54 by means of a threaded thrust member 66 such as a screw. Adjustment of the threaded member 66 may be by way of by an Allen key spanner 68 so as to cause the jaw 64 to grip the crank 54 against the two fixed jaws 60, 62.

Loosening the threaded member 66 allows removal of the crankshaft 54.

The headstock 42 passes through the central aperture to contact the crankshaft 54 for support.

Figure 5A:
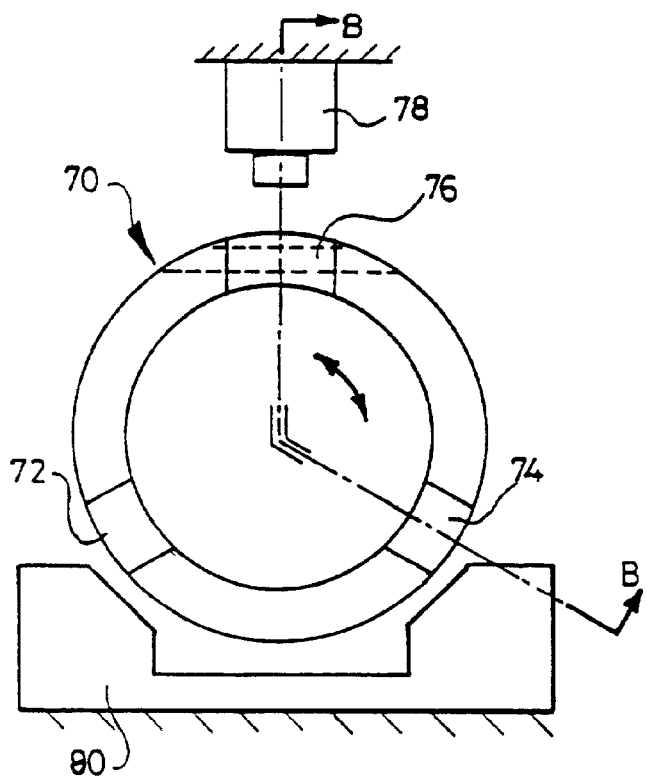
FIG. 5(a) is an end view of a preferred embodiment for clamping a workpiece within the drive decoupling means
Figure 5B:
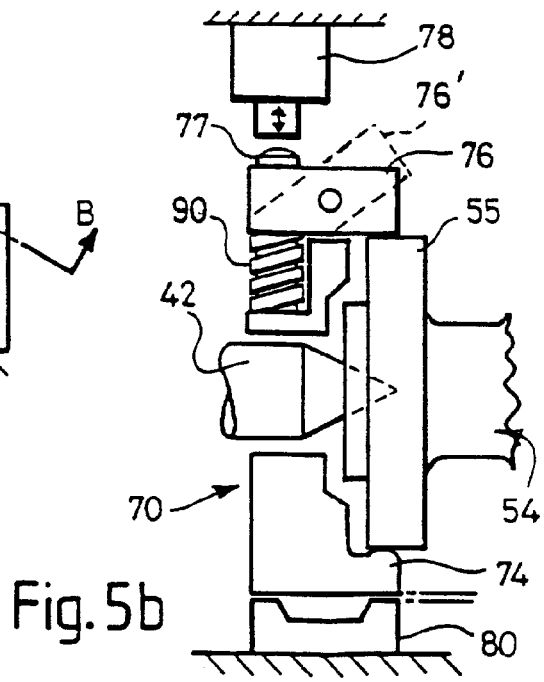
FIG. 5(b) is a section (not to scale) along line B—B of FIG. 5(a) and illustrates an adjustable jaw in more detail.

An alternative clamping device 70 is shown in FIGS. 5(a) and 5(b).

FIG. 5(a) shows a clamping ring 70 having as before two fixed jaws 72, 74 and an adjustable jaw 76. A hydraulic piston and cylinder 78 is provided to facilitate insertion and removal.

FIG. 5(b) is a section (not to scale) along line B—B of FIG. 5(a) and illustrates the adjustable jaw 76 in more detail.

In the clamped position a flange 55 of the crankshaft is held between the adjustable jaw 76 and the fixed jaws 72, 74. The spring 90 acts to urge the adjustable jaw 76 against the flange 55.

As before the headstock 42 passes through central apertures in the drive coupling device 10 and clamping ring 70 to support the crankshaft 54.

To release the crankshaft 54, the hydraulic cylinder 78 is actuated to push down on touch pad 77.

The spring 90 is sufficiently strong as to initially resist this downward force, which is thus transmitted to the ring 70 and the latter displaces downwards until it hits bed 80. Thereafter continued movement of the piston in the cylinder 78 results in compression of the spring 90 and pivoting of the jaw 76 into the position shown at 76', so all three jaws 72, 74, 76 are now clear of the flange 55.

The crankshaft 54 is now clear to be removed from the jaws 72, 74, 76.

The bed 80 is spaced by a running clearance from the clamping ring 70.

The interaction of the flange 55, the bed 80 and the spring 90 ensures that all three jaws 72, 74, 76 are moved clear of the flange 55.

FIG. 6 shows a view of a grinding machine housing 92 containing the drive means for operating the grinding machine, with a housing 94 attached, to encase a drive decoupling device such as is shown in FIG. 1.

The housing 94 encases the drive decoupling device except for a drive plate 96 and jaws 100, 102, 104. An annular attachment 98 fits over the housing 94 and attaches to the grinding machine drive housing 92. This ensures that no gap is left between the housing 94 and the housing 92 so as to improve safety and reduce the entry of dirt and swarf during machining.

Jaws 100, 102, 104 are provided for clamping a workpiece. An adjustable jaw 104 grips the workpiece against the two fixed jaws 100, 102. Rotation of the drive plate 96 by the drive means, contained within the housing 92, causes rotation of a clamped workpiece. A headstock 106 passes through the central aperture of the coupling device so as to allow for support of the workpiece during machining. The control panel 120 and bed of the machine 108 are shown.

As shown in FIG. 7 the headstock 106 passes through the central aperture of the coupling device. The latter comprises connecting members 108, 110 and a coupling sleeve 112 which are interconnected by laminated discs in the form of thin shimsteel rings 114, 116. The coupling device is connected at one end to the driving means and at the other end is detachably securable to the workpiece by means of the jaws 100, 102, 104 only 102, 104 of which are visible in FIG. 7). A faceplate 118 is shown surrounding the headstock 106, with the cover 94 enclosing the entire coupling device shown.

What is claimed is:

1. A drive decoupling means comprising a driving member, a driven member which is attachable by securing means to a workpiece, mounted between a headstock and tailstock, so as to rotate the workpiece about a drive axis, and a connecting means for transferring torque therebetween which comprises a flexible coupling device attached to the driving member via at least one off axis connection and to the driven member by at least one other off axis connection, the connections being circularly spaced one from the other, and the coupling device being centrally apertured to accommodate the headstock, which can thereby extend axially therethrough.

2. A drive decoupling means according to claim 1, wherein the driven member is provided with radially adjustable securing means for securing it to the workpiece.

3. A drive decoupling means according to claim 2, wherein the securing means is arranged symmetrically and allows centering of the driven member relative to the workpiece.

4. A drive decoupling means comprising a driving member, a driven member provided with radially adjustable securing means for securing said driven member to a workpiece mounted between a headstock and tailstock so as to rotate the workpiece about a drive axis, said securing means comprising radially fixed and radially adjustable positioning and holding members symetrically arranged to allow centering of said driven member relative to a workpiece, and a connecting means for transferring torque therebetween which comprises a flexible coupling device attached to the driving member via at least one off axis connection and to the driven member by at least one other off axis connection, said connections being circularly spaced one from the other, and said coupling device being centrally apertured to accommodate the headstock which can thereby extend axially therethrough.

5. A drive decoupling means according to claim 4, wherein at least one positioning and holding member is securable so as to grip the workpiece but is spring loaded in a direction away from the workpiece so as to cause seperation from the workpiece to facilitate its demounting after a machining operation.

6. A drive decoupling means according to claim 5, wherein said at least one positioning and holding member is externally adjustable.

7. A drive decoupling means according to claim 6 wherein the adjustment of the positioning and holding member is provided by pneumatic means to facilitate automatic release and removal of a workpiece.

8. A drive decoupling means according to claim 6 wherein the adjustment of the positioning and holding member is provided by electrical means to facilitate automatic release and removal of a workpiece.

9. A drive decoupling means according to claim 6 wherein the adjustment of the positioning and holding member is provided by hydraulic means to facilitate automatic release and removal of a workpiece.

10. A drive decoupling means comprising a driving member, a driven member attachable by securing means to a workpiece mounted between a headstock and tailstock so as to rotate the workpiece about a drive axis, and a connecting means, comprising a flexible coupling device attached to said driving member by at least one off axis connection and to said driven member by at least one other off axis connection for transferring torque therebetween, said off axis connections being circularly spaced one from the other, said coupling device being centrally apertured to accommodate the headstock which can thereby extend axially therethrough, said flexible coupling device being laminated from flexible sheet material so that in use said connecting means is torsionally rigid in a plane perpendicular to the drive axis to transmit rotation to said driven member, the flexibility of said laminations accommodating any eccentricity developed through misalignment of said driving member and driven member, said securing means comprising three positioning and holding members arranged circularly around an annular member, two of said positioning and holding members being fixed thereto and the third said positioning and holding member being a spring member spring loaded in a direction to engage a workpiece, such that the latter is positioned between said three positioning and holding members, and so that displacement of said annular member in a direction parallel to the axis of said spring loading, so as to compress the spring, results in seperation of the spring and fixed members from the workpiece to facilitate its removal.

11. The drive decoupling means of claim 10 wherein said securing means is radially adjustable.

12. The drive decoupling means of claim 11 wherein said securing means is arranged symetrically and allows centering of the driven member relative to the workpiece.

13. The drive decoupling means of claim 12 wherein said securing means comprises radially fixed and radially adjustable positioning and holding members.

14. The drive decoupling means of claim 13 wherein at least one positioning and holding member is securable so as to grip the workpiece but is spring loaded in a direction away from the workpiece so as to cause separation from the workpiece to facilitate its demounting after a machining operation.

15. The drive decoupling means according to claim 14 wherein said at least one positioning and holding means is externally adjustable.

16. A method of decoupling a driven member from a driving member used to rotate the drive member, wherein two drive decoupling means according to claim 10 are connected in series, the driven member of the first being connected to the driving member of the second, so as to permit offset and misalignment to be accommodated.

17. A lathe having a headstock and tailstock for supporting a workpiece therebetween wherein rotation of the workpiece is effected through at least one drive decoupling means constructed according to claim 10.

18. A lathe having a headstock and tailstock for supporting a workpiece therebetween, wherein rotation of the workpiece is effected through two drive decoupling means constructed according to claim 10, and connected in series so as to remove errors due to offset and misalignment.

19. A drive decoupling means comprising a driving member, a driven member provided with radially adjustable securing means for securing said driven member to a workpiece mounted between a headstock and tailstock so as to rotate the workpiece about a drive axis, said securing means including at least two positioning and holding members, at least one positioning and holding member being adjustable and at least one other positioning and holding member being fixed, said securing means being symetrically arranged to allow centering of said driven member relative to a workpiece, and a connecting means for transferring torque therebetween which comprises a flexible coupling device attached to said driving member via at least one off axis connection and to said driven member by at least one other off axis connection, said connections being circularly spaced one from the other, and said coupling device being centrally apertured to accommodate the headstock which can thereby extend axially therethrough.

20. A drive decoupling means according to and any of claims, 4, 5, 6 or 19 wherein the flexible coupling device is laminated from flexible sheet material, so that is use said connecting means in torsionally rigid in a plane perpendicular to the drive axis to transmit rotation to the driven member, with the flexibility of the laminations accommodating any eccentricity developed through misalignment of the driving member and driven member.

21. A method of decoupling a driven member from a driving member used to rotate the driven member, wherein two drive decoupling means according to claim 20 are connected in series, the driven member of the first drive decoupling means being connected to the driving member of the second drive decoupling means, so as to permit offset and misalignment to be accommodated.

22. A drive decoupling means comprising a driving member, a driven member which is attachable by securing means to a workpiece, mounted between a headstock and tailstock, so as to rotate the workpiece about a drive axis, and a connecting means for transferring torque therebetween which comprises a flexible coupling device attached to the driving member via at least one off axis connection and to the driven member by at least one other off axis connection, the connections being circularly spaced one from the other, and the coupling device being centrally apertured to accommodate the headstock, which can thereby extend axially therethrough, said flexible coupling device being laminated from flexible sheet material, so that in use said connecting means is torsionally rigid in a plane perpendicular to the drive axis to transmit rotation to the driven member, with the flexibility of the laminations accommodating any eccentricity developed through misalignment of the driving member and driven member.

23. A method of decoupling a driven member from a driving member used to rotate the driven member, wherein two drive decoupling means according to claim 22 are connected in series, the driven member of the first drive decoupling means being connected to the driving member of the second drive decoupling means, so as to permit offset and misalignment to be accommodated.

24. A drive decoupling means comprising a driving member, a driven member which is provided with radially adjustable securing means for securing it to a workpiece, mounted between a headstock and tailstock, so as to rotate the workpiece about a drive axis, and a connecting means for transferring torque therebetween which comprises a flexible coupling device attached to the driving member via at least one off axis connection and to the driven member by at least one other off axis connection, the connections being circularly spaced one from the other, and the coupling device being centrally apertured to accommodate the headstock, which can thereby extend axially therethrough, said flexible coupling device being laminated from flexible sheet material, so that in use said connecting means is torsionally rigid in a plane perpendicular to the drive axis to transmit rotation to the driven member, with the flexibility of the laminations accommodating any eccentricity developed through misalignment of the driving member and driven member.

25. A method of decoupling a driven member from a driving member used to rotate the driven member, wherein two drive decoupling means according to claim 24 are connected in series, the driven member of the first drive decoupling means being connected to the driving member of the second drive decoupling means, so as to permit offset and misalignment to be accommodated.

26. A drive decoupling means comprising a driving member, a driven member which is provided with radially adjustable securing means for securing it to a workpiece, mounted between a headstock and tailstock, so as to rotate the workpiece about a drive axis, said securing means being arranged symmetrically and allowing centering of said driven member relative to the workpiece and a connecting means for transferring torque therebetween which comprises a flexible coupling device attached to the driving member via at least one off axis connection and to the driven member by at least one other off axis connection, the connections being circularly spaced one from the other, and the coupling device being centrally apertured to accommodate the headstock, which can thereby extend axially therethrough, said flexible coupling device being laminated from flexible sheet material, so that in use said connecting means is torsionally rigid in a plane perpendicular to the drive axis to transmit rotation to the driven member, with the flexibility of the laminations accommodating any eccentricity developed through misalignment of the driving member and driven member.

27. A method of decoupling a driven member from a driving member used to rotate the driven member, wherein two drive decoupling means according to claim 26 are connected in series, the driven member of the first drive decoupling means being connected to the driving member of the second drive decoupling means, so as to permit offset and misalignment to be accommodated.

* * * * *